US012585358B1

(12) United States Patent　　(10) Patent No.:　US 12,585,358 B1
Bhanushali　　(45) Date of Patent:　Mar. 24, 2026

(54) DYNAMIC KERNEL SELECTION FOR TOUCHSCREEN DEVICES

(71) Applicant: STMicroelectronics International N.V., Geneva (CH)

(72) Inventor: Abhay Jaisen Bhanushali, Singapore (SG)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 19/088,585

(22) Filed: Mar. 24, 2025

(51) Int. Cl.
　　*G06F 3/041*　　(2006.01)
　　*G06F 3/0354*　　(2013.01)
　　*G06F 3/044*　　(2006.01)
(52) U.S. Cl.
　　CPC ........ *G06F 3/0418* (2013.01); *G06F 3/03545* (2013.01); *G06F 3/0442* (2019.05)
(58) Field of Classification Search
　　CPC ... G06F 3/0418; G06F 3/0442; G06F 3/03545
　　See application file for complete search history.

(56) References Cited

U.S. PATENT DOCUMENTS

| | | | | |
|---|---|---|---|---|
| 10,672,187 | B2 * | 6/2020 | Nagano | ............... G06F 3/04845 |
| 11,960,681 | B2 * | 4/2024 | Vandermeijden | ... G06F 3/04162 |

| | | | | |
|---|---|---|---|---|
| 2010/0315372 | A1 | 12/2010 | Ng | |
| 2013/0234978 | A1 | 9/2013 | Ksondzyk | |
| 2014/0035859 | A1 | 2/2014 | Wilson et al. | |
| 2015/0242021 | A1 | 8/2015 | Weaver et al. | |
| 2018/0033195 | A1 * | 2/2018 | Nagano | ................... G06T 19/20 |
| 2019/0121488 | A1 | 4/2019 | Chandran et al. | |
| 2023/0027365 | A1 * | 1/2023 | Vandermeijden | ... G06F 3/04162 |
| 2024/0211075 | A1 * | 6/2024 | Vandermeijden | ... G06F 3/03545 |

FOREIGN PATENT DOCUMENTS

| | | | | |
|---|---|---|---|---|
| KR | 100512963 | B1 * | 9/2005 | |

OTHER PUBLICATIONS

Machine translation of KR-100512963-B1. (Year: 2025).*

* cited by examiner

*Primary Examiner* — Michael Pervan
(74) *Attorney, Agent, or Firm* — Slater Matsil, LLP

(57)　　　　　ABSTRACT

A method for dynamic kernel selection on touchscreen device. The method includes receiving a signal from an active pen, collecting a first strength value from a first node and a second strength value from a second node of a touchscreen, the second node being adjacent to the first node, calculating a peak-to-side ratio from the first strength value and the second strength value, determining a location of the active pen between the first node and the second node based on the calculated peak-to-side ratio, selecting a kernel type based on the location of the active pen, applying the selected kernel type to the first strength value and the second strength value, and reporting a corrected location of the active pen on the touchscreen based on the applied kernel type.

20 Claims, 14 Drawing Sheets

400

Diamonds (D)

Hollow (H)

Empty (E)

Islands (I)
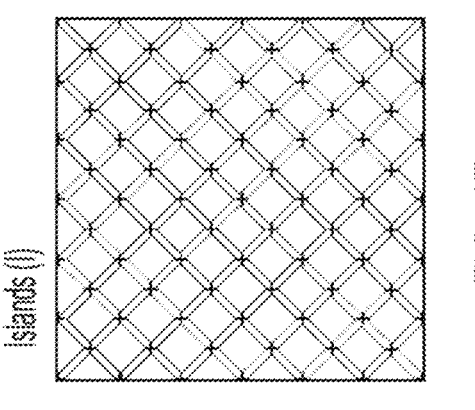
FIG. 4F
Radiator (R)
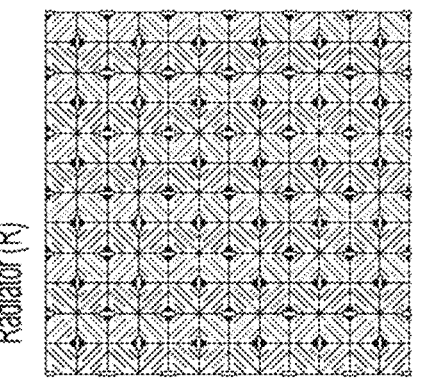
FIG. 4E
Matrix (M)
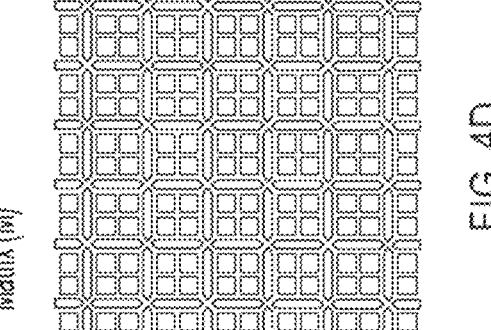
FIG. 4D
400

700

| Sr No. | Location | Kernel Type |
|--------|----------|-------------|
| 1 | Center Region | $a$-type |
| 2 | Midpoint Region | $b$-type |
| 3 | Intermediate Region (between midpoint and center point) | $b$-type |

710

711

717

713

715

RXn-1       RXn       RXn+1

810

820

900

910

DYNAMIC KERNEL SELECTION FOR TOUCHSCREEN DEVICES

TECHNICAL FIELD

The present invention relates generally to an electronic device, and, in particular embodiments, to a dynamic kernel selection process on touchscreens.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

With the growth of smart phones and tablets, application software, such as painting software, higher precision touch is preferred. Applications like this have led to the use of the pen (stylus) to be more common and higher performance of the pen is preferred. The pens can be divided into active pens and passive capacitive pens. Passive capacitive pens function similar to a finger touching a touchscreen device. Coordinates of the pen are determined based on changes in capacitance at the point of touch. In an active pen, a touch IC sends a signal to a pen for pairing. The pen sends a signal to the touch IC when paired. The touch IC of the touchscreen receives the signal and calculates the coordinates of the pen.

Active pens allow the user touch the touchscreen with improved precision. For example, given the appropriate software, users are able to utilize active pen for precise sketching, drawing, and hand writing. The precision of an active pen can depend on the indium tin oxide (ITO) pattern in the touch screen panel design and different ITO pattern designs have various capacitance distribution profiles that may affect the pen's accuracy.

SUMMARY

One general aspect includes a method of operating an electronic device. The method includes receiving a signal from an active pen; collecting a first strength value from a first touch node and a second strength value from a second touch node of a touchscreen, the second touch node being adjacent to the first touch node; calculating a peak-to-side ratio from the first strength value and the second strength value; determining a location of the active pen between the first touch node and the second touch node based on the calculated peak-to-side ratio; selecting a kernel type based on the location of the active pen; applying the selected kernel type to the first strength value and the second strength value; and reporting a corrected location of the active pen on the touchscreen based on the applied kernel type.

Another general aspect includes a device that includes a touchscreen and a touch controller. The touchscreen includes a plurality of touch nodes including a first touch node that is adjacent to a second touch node. The touch controller is configured to: receive a signal from an active pen; collect a plurality of strength values from the plurality of touch nodes calculate a peak-to-side ratio from a first strength value if the first touch node and a second strength value of the second touch node; determine a location of the active pen between the first touch node and the second touch node based on the calculated peak-to-side ratio; select a kernel type based on the location of the active pen; apply the selected kernel type to the plurality of strength values; and reporting a corrected location of the active pen on the touchscreen based on the applied kernel type.

Another general aspect includes a method that includes receiving a signal from an active pen; performing a self-sensing scan to collect strength data on a touchscreen; determining a location of the active pen between a first touch node and a second touch node based on the collected strength data, the first touch node being next to the second touch node; selecting a kernel type based on the location of the active pen; performing 1D convolution based the selected kernel type and the collected strength data; and reporting a corrected location of the active pen on the touchscreen based on a result of the 1D convolution.

Another general aspect includes a method that includes performing a self-sensing scan to collect strength data on a touchscreen; determining a location of an active pen on a first touch node based on the collected strength data, the location of the active pen includes a central region on the first touch node, a midpoint region on the first touch node, and an intermediate region on the first touch node; selecting a kernel type based on the location of the active pen; performing 1D convolution based the selected kernel type and the collected strength data; and reporting a corrected location of the active pen on the touchscreen based on a result of the 1D convolution.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which:

FIG. 4, which includes FIGS. 4A-4F, shows indium tin oxide (ITO) patterns for an electronic device according to embodiments of the present application;

DETAILED DESCRIPTION OF ILLUSTRATIVE EMBODIMENTS

Embodiments of the present invention relate to a touchscreen device that can correct a location of an input from an active pen by using a dynamic switching kernel to improve the accuracy of inputs from the active pen on the touchscreen device. Various embodiments of the present application disclose a touchscreen device and a method for correcting a location of an input received on the touchscreen device. Various embodiments of the present application disclose a method for correcting an input from an active pen by using a dynamic switching kernel to determine a location of the active pen on the touchscreen and apply a spatial filter kernel based on the location of the active pen.

A touch controller of an electronic device can perform self-capacitance sensing to collect strength values based on the changes in capacitance at touch nodes on the touch screen panel. To improve the accuracy of an active pen, the touch controller can utilize the dynamic switching kernel to select a spatial filter kernel based on the strength values of the touch nodes and correct a distribution of the strength values of the touch nodes using 2-pass 1D convolution (e.g., one pass in TX direction and one pass in RX direction) based on the selected spatial filter kernel. The dynamic switching kernel provides efficient active pen tracking without large look-up tables (LUTS) or extensive curve fitting or position estimation that may introduce lag or processing delays. The dynamic switching kernel also provides a solution that does not require incorporating a larger number of TX and RX channels that would require a more complex design or heavy filtering or curve fitting that can create a lag in the start of a drawing.

Embodiments of the application can improve active pen tracking by selecting a spatial filter kernel that can spread the strength linearly between touch nodes (e.g., smoothening kernel), flattening the strength between touch nodes (e.g., flattening kernel), or sharpening the strength at a touch node (e.g., sharpening kernel). The spatial filter kernels can improve accuracy and linearity of active pen tracking across different touch screen panel designs without requiring panel modifications.

While the aspects are described primarily in the context of active pen tracking on touch screen panels, it should also be appreciated that these aspects may also apply to other touch sensing applications and devices. In particular, aspects of this disclosure may similarly apply to passive stylus detection, finger touch detection, mutual capacitance sensing systems, self-capacitance sensing systems, and various types of touch-enabled displays including smartphones, tablets, laptops, monitors, and other consumer electronic devices utilizing capacitive touch sensing technology.

Figure 1:
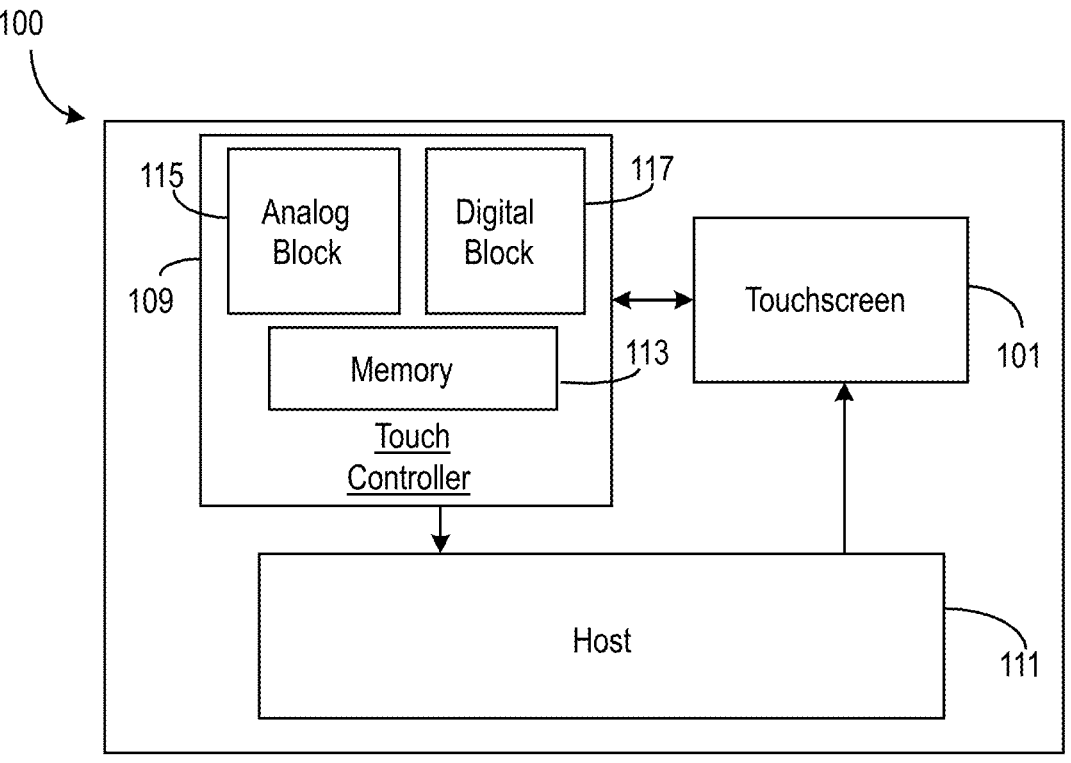
FIG. 1 shows a component schematic of an electronic device according to an embodiment of the present application.

FIG. 1 shows a component schematic of an electronic device according to an embodiment of the present application. The electronic device 100 may include a touchscreen 101, a touch controller 109, and a host 11 coupled to each other through a bus. The electronic device 100 may be a smart phone, a GPS device, a tablet computer, a mobile media player, a laptop, a gaming system, a personal computer, or any other electronic device that may utilize a touch sensitive display.

While the inventive aspects are described primarily in the context of touchscreen displays in mobile devices and smartphones, it should also be appreciated that these inventive aspects may also apply to other touch-enabled electronic devices and systems. In particular, aspects of this disclosure may similarly apply to tablets, laptops, monitors, kiosks, point-of-sale terminals, automotive displays, industrial control panels, gaming devices, and other touch interface implementations.

The touchscreen 101 may be an organic light emitting diode (OLED) display, an LED display, or any other type of display. The touchscreen 101 may include a plurality of pixels in a display layer configured to display an image. As understood by those with ordinary skill in the art, the display layer of the touchscreen 101 may include of the plurality of pixels positioned at each of the intersections between the data lines and scan lines. The plurality of scan lines may extend across the rows of the touchscreen 101, and data lines that extend across the columns of the touchscreen 101 in a matrix like formation. The touchscreen 101 may also include a touch panel configured to detect touch inputs made on the touchscreen 101. The touch panel, which will be described in more detail below, may include a sensor and a sensor interface.

The touch controller 109 may perform various methods with respect to the touchscreen 101. In various embodiments, the touch controller 109 may be a processor that analyzes information and carries out a series of executable scripts, e.g., stored in a memory 113. For example, the touch controller 109 may analyze information and carry out a series of firmware (FW) or software (SW) algorithms stored in memory 113. In one or more embodiments, the processor may comprise an application-specific integrated circuit (ASIC) device, a central processing unit (CPU), or any other processing unit known in the art. In various embodiments, the touch controller 109 may comprise a number of separate computing units such as cores integrated within one processor, or distinct separate processing chips.

In various embodiments, the touch controller 109 may include an analog block 115, a digital block 117, and a memory 113 operable by a processor. The analog block 115 may include a plurality of analog circuits configured to measure capacitances across touchscreen 101 and convert them into digital values. The digital block 117 may comprise a variety of digital logic circuits such as DACs or digital control systems configured to obtain digital touch data from the analog block 115, process the digital touch data and store them into memory 113.

In various embodiments, the memory 113 may be configured to store data and instructions for the touch controller 109 and may comprise various programs to be executed by the touch controller 109. The memory 113 may include a non-transitory computer readable medium that stores instructions for execution by the touch controller 109. The memory 113 may comprise both volatile and non-volatile components to support temporary data storage during processing and long-term storage of system software and calibration data. The volatile memory, typically RAM, provides fast access for temporary storage of sensor data, intermediate results, and current state information for a gesture recognition system. The non-volatile memory, such as Flash or EEPROM, can store information such as the device's firmware, gesture recognition algorithms, and sensor calibration data.

In various embodiments, the host 11, may also be known as a system on a chip or an application processor, and may comprise a processor, interface, circuitry, and/or the like configured to direct the flow of input and output data to the touchscreen 101 and the associated touch controller 109.

The host 11 may be configured to receive touch event data from the touch controller 109 and interpret the touch event data based on a user interface or application displayed on the touchscreen 101. The host 111 may be configured to transmit image data to the touchscreen 101 to be displayed on the touchscreen 101.

Additionally, the touch controller 109 may be configured to detect touch inputs via a touchscreen 101. In other words, the touch controller 109 may be configured to send touch driving signals (TDS) to the touchscreen, receive touch sensing signals (TSS) in return from the touchscreen, process the TSS to determine coordinates of touch, and report them to the host 11. The touch controller 109 may be configured to perform mutual and self-sensing scans to collect touch data or strength values based on a change in strength of mutual capacitance and self-capacitances from the touch inputs on the touchscreen 101. Then based on the touch data collected from scanning, the touchscreen may be used by the touch controller 109 to determine the location or coordinates of touch, and report them to the host 11. Then, the host 11 may provide an output to the touchscreen 101 based on the reported coordinates of touch.

Advantageously, as will be described in more detail below, embodiments of the present application disclose an electronic device configured to correct a location or coordinate of an input on the touchscreen, and a method for correcting the location or coordinate of an input from an active pen by using a dynamic switching kernel. In other words, a location of an input from an active pen may be imprecise and the location of the input can be corrected before reporting the input to the host.

Figure 2:
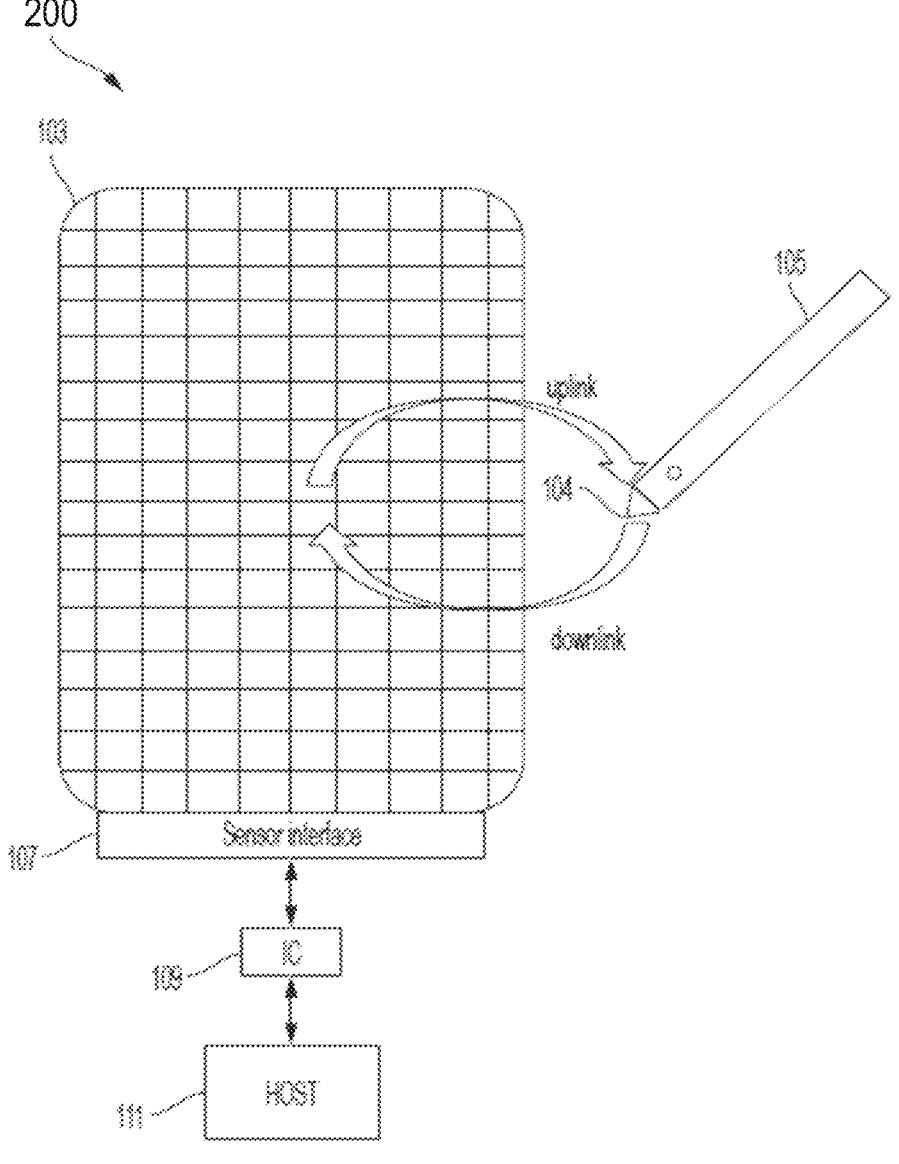
FIG. 2 shows a schematic representation of a touch panel of a touchscreen according to an embodiment of the present application.

FIG. 2 shows a schematic representation of a touch panel of a touchscreen according to an embodiment of the present application. FIG. 2 will be described in conjunction with FIG. 1.

The touch panel 200 of the touchscreen 101 may include a sensor 103 and a sensor interface 107. The sensor interface 107 may be coupled to the touch controller 109 that is coupled to the host 11 as described in FIG. 1. The touch panel 200 is compatible with an active pen 105. In various embodiments, the touch panel 200 may be incorporated in a tablet, computer, smart phone, handheld gaming unit, or similar electronic devices.

In various embodiments, the sensor 103 includes a plurality of touch sensors or touch nodes arranged in rows and columns across the touch panel 200. The touch nodes may be formed by electrically coupling the touchscreen to rows of capacitive electrodes and columns of capacitive electrodes that span the touchscreen 101. In some embodiments, the rows of capacitive electrodes may span the touchscreen 101 in the x-direction and the columns of capacitive electrodes may span the touchscreen 101 in the y-direction. The intersections of the rows of capacitive electrodes and the columns of capacitive electrodes have a measurable mutual capacitance. In addition, each of the rows of capacitive electrodes and each of the columns of capacitive electrodes may have a self-capacitance that may be measured with respect to ground. The touch panel 200 can be configured to detect touch inputs (e.g., finger touch or active pen touch) made on the touchscreen 101 by measuring the change in mutual capacitance at the intersections between the touch nodes, by measuring the self-capacitance at the touch nodes, or both.

In one or more embodiments, the touch panel 200 may be configured to operate with an active pen 105. In one or more embodiments, the active pen 105 may comprise an active tip 104 comprising an active electrode made out of a conductive material such as metal, conductive paint, conductive ink, or any other suitable conductive material. The active tip 104 may be configured to function as an antenna configured to receive an uplink signal from the sensor 103 and transmit a downlink signal back to the sensor 103. When the sensor 103 detects the active tip 104 via the downlink signal, the touch panel 200 may be configured to transmit an uplink signal to the active tip 104. The active pen 105 analyzes the uplink signal by measuring a change in potential between the active tip 104 and a ground potential. While the signal between the sensor 103 and the active pen 105 may be described as an uplink signal and a downlink signal, it should also be appreciated that other types of communication protocols can be utilized between the sensor 103 and the active pen 105.

In one or more embodiments, the active pen 105 may be held in a hand of the user and used to input more precise handwriting, drawings, sketches, and other inputs into the touchscreen 101 by touching the active tip 104 of the active pen 105 to the touchscreen 101. The active pen 105 may be, for example, a USI-compatible pen, a Wacom WGP-compatible pen, a Wacom AES-compatible pen, an MPP-compatible pen, or other compatible proprietary pens.

The active pen 105 and the touch controller 109 can establish communication through the sensor 103 and the sensor interface 107. The touch controller 109 and the active pen 105 may communicate bi-directionally. The sensor 103 may be configured to receive a signal generated from the active pen 105 and transmit a signal generated from the touch controller 109. The sensor interface 107 may be configured to transmit the signal received by the sensor 103 to the touch controller 109 and transmit the signal generated by the touch controller 109 to the touch panel 200. The signal transmitted from the touch controller 109 through the sensor interface 107 and sensor 103 to the active pen 105 may be defined as an uplink signal, and the signal transmitted by active pen 105 to the sensor 103 through the sensor interface 107 to the touch controller 109 may be defined as a downlink signal.

In one or more embodiments, the touch controller 109 may send the uplink signal to the active pen 105 for pairing. The uplink signal may be transmitted from the touch controller 109 through the sensor interface 107 and the sensor 103 to the active pen 105. When pairing is successful, the active pen 105 sends a downlink signal to the touch controller 109. The downlink signal may be transmitted from the active pen 105 through the sensor 103 and the sensor interface 107 to the touch controller 109. When the touch controller 109 does not receive a valid downlink signal, the touch controller 109 may timeout and send an unpair command to the pen via an uplink signal. In general, active pens are more sensitive to uplink signals than a touch controller is to downlink signals due to signal strength.

In one or more embodiments, when communication is established between the touch panel 200 and the active pen 105, a location of the active pen 105 or pen coordinates can be reported to the host 111 and appear on the touchscreen 101 when the active tip 104 is touching or close to the touchscreen 101. The location of the active pen 105 or pen coordinates is a location of the active tip with respect to the coordinates on the touch panel 200. When the active tip of the active pen is close to or hovering over the touchscreen 101, the pen coordinates may appear as a cursor on the touchscreen 101 that corresponds to the location of the active tip 104. When the active tip 104 of the active pen 105 is touching the touchscreen 101, the pen coordinates may appear as a drawing mark, selection, or similar on the touchscreen 101 that corresponds to the location of the active tip.

In one or more embodiments, the touch controller 109 may report the pen coordinates to a host 11. The host 11 may receive a user's finger touch coordinates in addition to the pen coordinates. The host 11 can include any processing hardware that executes software that utilizes the user input obtained from the touchscreen 101. In embodiments discussed herein, this user input can be either passive (e.g., by touch with a finger or non-active pen or stylus) or active (e.g., with an active pen).

Figure 3A:
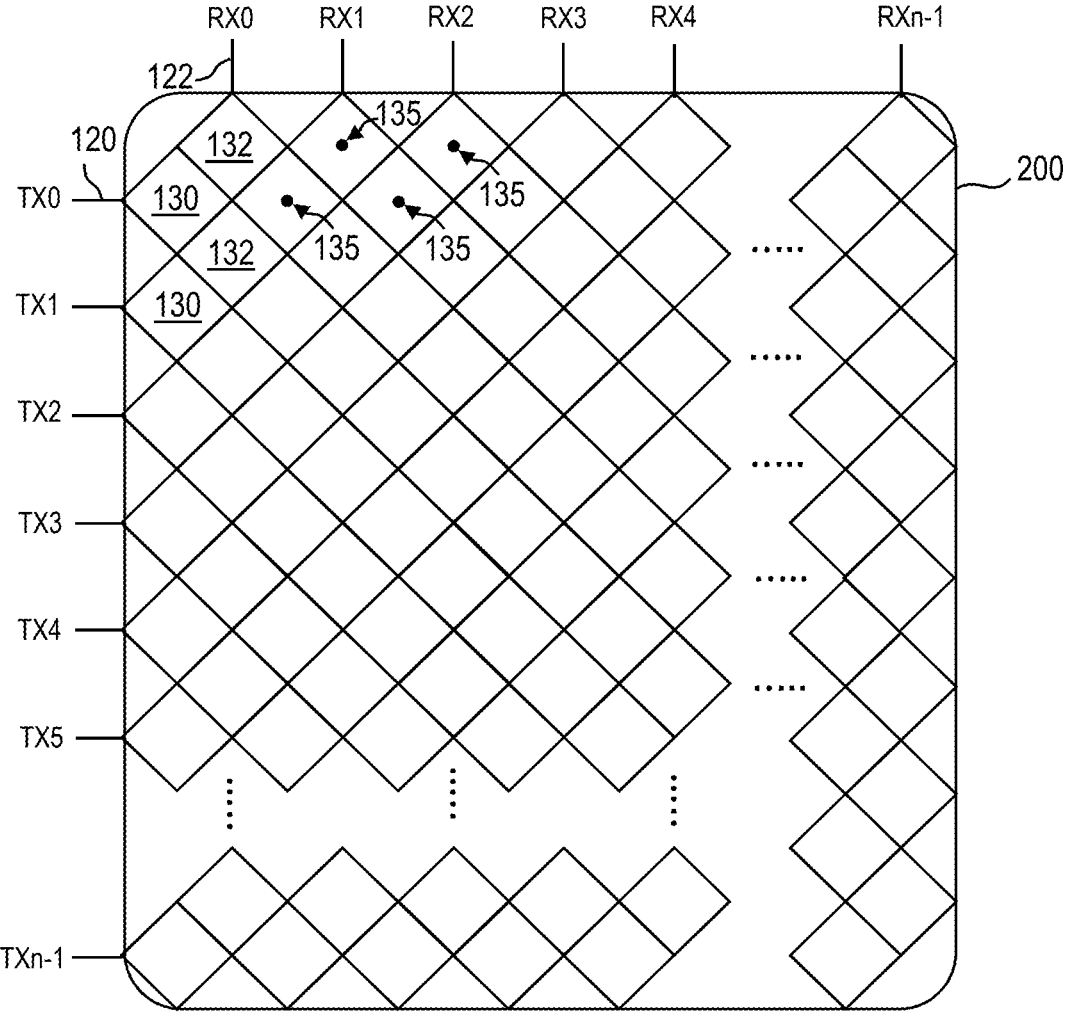
FIGS. 3A and 3B show touch nodes on an electronic device according to an embodiment of the present application.
Figure 3B:
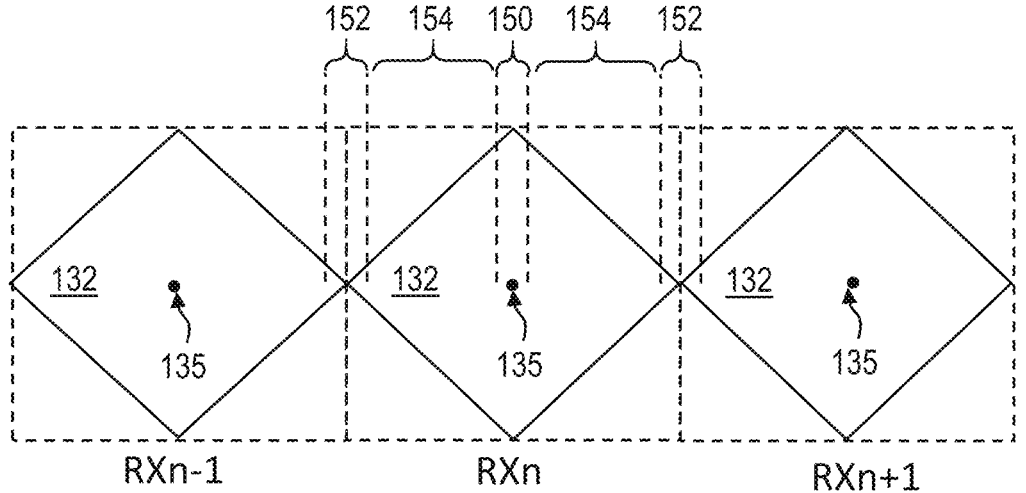

FIGS. 3A and 3B show touch nodes on an electronic device according to an embodiment of the present application. FIGS. 3A and 3B will be described in conjunction with FIGS. 1 and 2.

In one or more embodiments, an electronic device 300 may include a touch panel having multiple touch nodes 130, 132 arranged in rows and columns to form a matrix sensing layer. The touch nodes 130, 132 may be referred to as capacitive electrodes. In some embodiments, the touch nodes 130 may be referred to as transmit (TX) electrodes 130 and the touch nodes 132 may be referred to as receive (RX) electrodes 132. The TX electrodes 130 and RX electrodes 132 may span the touch panel 200 in a grid-like fashion that are operable by a touch controller 109 to enable mutual capacitive sensing between the RX electrodes 132 and TX electrodes 130 for detecting and tracking touch inputs. In various embodiments, the touch nodes may be arranged in various patterns across the touch panel 200. For example, referring to FIG. 3A, the touch nodes 130, 132 may be arranged in a diamond pattern.

In various embodiments, the TX electrodes 130 may be formed in rows across the touch panel 200 and the RX electrodes 132 may be formed in columns across the touch panel 200. In other embodiments, the RX electrodes 132 may be formed in rows across the touch panel 200 and the TX electrodes 130 may be formed in columns across the touch panel 200. The TX electrodes 130 and the RX electrodes 132 may overlap in certain embodiments.

In one or more embodiments, the transmit (TX) electrodes correspond to TX channels 120 (i.e., TX0 to TXn−1) and the receive (RX) electrodes 132 correspond to RX channels 122 (i.e., RX0 to RXn−1). The TX channels 120 and RX channels 122 are arranged orthogonally to enable mutual capacitive sensing at their intersections. The touch nodes 130, 132 have a measurable capacitance that can be used to determine a location or coordinate of a touch input. The touch nodes 130, 132 have a sensing size or a defined pitch size. The pitch size of the touch node 130, 132 is generally larger than an active tip 104 of an active pen 105. For example, the touch node 130, 132 may be approximately 4 mm and the active tip may be approximately 1.4 mm. When the active tip 104 is moving within the pitch of a touch node 130, 132, the pen coordinates may not be detected accurately because the change in capacitance may not be linearly distributed across the touch nodes 130, 132.

In one or more embodiments, each touch node 130, 132 may include a central region 150, a midpoint region 152, and an intermediate region 154 that is relative to a reference point 135 at the center of the touch node 130, 132. Referring to FIG. 3B, for example, the touch nodes 132 (i.e., RXn−1, RXn, RXn+1) include a central region 150, a midpoint region 152, and an intermediate region 154 between the central region 150 and the midpoint region 152. The central region 150, midpoint region 152, and intermediate region 154 will be further discussed in FIGS. 6 and 7A to 7D.

In one or more embodiments, a touch controller 109 may be coupled to the TX electrodes 130 and the RX electrodes 132. During a touch sensing operation or a touch scan operation, the touch controller 109 may transmit touch driving signals to the TX electrodes 130 and receive touch sensing signal from the RX electrodes 132. The touch controller 109 can be configured to perform self-capacitance sensing (i.e., self-sensing scan) to measure changes in capacitance relative to ground and mutual capacitance sensing (i.e., mutual sensing scan) to measure changes in capacitance between two electrodes.

In one or more embodiments, the touch controller 109 can perform a self-sensing scan by activating all TX electrodes and RX electrodes simultaneously to measure strength values that indicate changes in capacitance at each TX electrode and RX electrode. The touch controller 109 can perform a mutual capacitance scan by sequentially activating the TX channels 120 and RX channels 122 to measure strength values between the TX electrodes 130 and the RX electrodes 132.

In one or more embodiments, when a touch input from a user's finger or from an active pen is in close proximity to or touching the touchscreen 101, the mutual capacitance and self-capacitance of the TX electrodes 130 and the RX electrodes 132 will change. Thus, the touch input will be detected and the strength values will change. The touch controller 109 can measure and analyze the strength values of the touch nodes 130, 132, and report the touch coordinates or pen coordinates to the host 11. For example, the touch nodes 130, 132 can detect signals from an active pen when the active pen contacts or hovers near the touchscreen 101. When an active pen is in close proximity to the touchscreen 101, the TX electrodes 130 and the RX electrodes 132 may receive a downlink signal transmitted from the active pen. The touch controller 109 can process the downlink signal and measure the pen coordinates.

Figure 4A:
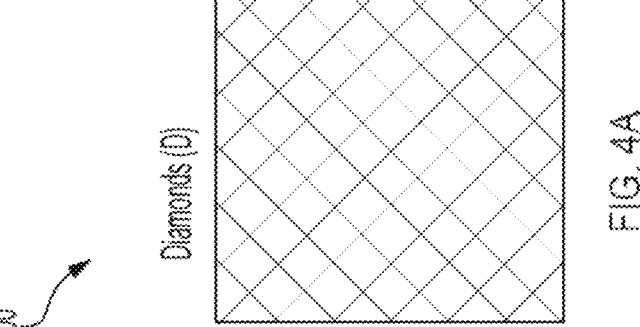
Figure 4B:
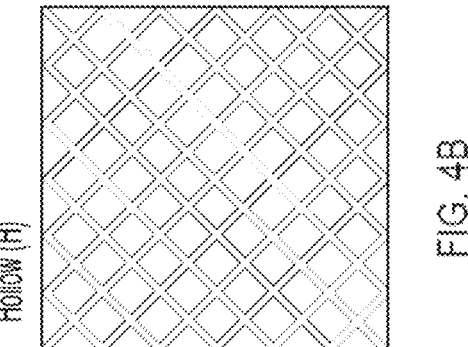
Figure 4C:
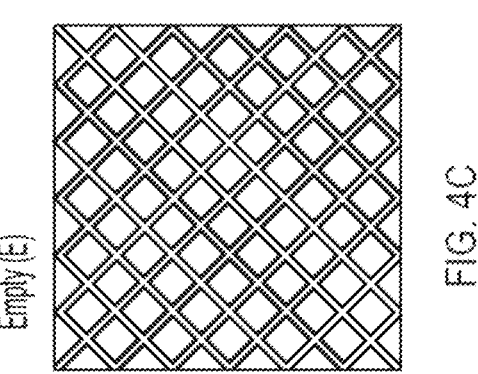

FIGS. 4A-4F, collectively FIG. 4, show indium tin oxide (ITO) patterns for an electronic device according to an embodiment of the present application. FIG. 4 will be described in conjunction with FIGS. 1, 2, and 3.

In one or more embodiments, the touch panel 200 includes an ITO layer formed by a ratio of indium, tin, and oxygen. The ITO layer may have various indium tin oxide (ITO) patterns 400 each representing different touch sensor arrangements. The ITO patterns 400 may include, for example, a diamond pattern (FIG. 4A), a hollow pattern (FIG. 4B), an empty pattern (FIG. 4C), a matrix pattern (FIG. 4D), a radiator pattern (FIG. 4E), and an island pattern (FIG. 4F).

In various embodiments, the diamonds pattern (D) features a continuous diamond-shaped grid structure where the electrode channels (i.e., TX and RX channels) intersect between the diamond-shaped capacitive electrodes. The hollow pattern (H) includes similar diamond shapes with hollow centers. The empty pattern (E) includes similar diamond shapes with empty spaces between the electrode intersections. The matrix pattern (M) utilizes a traditional grid layout with rectangular or square sensing nodes formed by perpendicular electrode channels or lines. The radiator pattern (R) implements a complex geometric arrangement with additional internal electrode structures at each node. The islands pattern (I) creates isolated diamond-shaped sensing regions separated by gaps in the electrode pattern.

In various embodiments, each ITO pattern 400 may have a unique capacitance distribution profile that may cause imprecise touch coordinates. These varying patterns can affect how capacitive changes are detected when an active pen 105 moves across the touchscreen 101. The specific ITO pattern chosen for a touch panel 200 can impact sensing characteristics such as signal strength, noise immunity, and position detection accuracy.

Figure 5A:
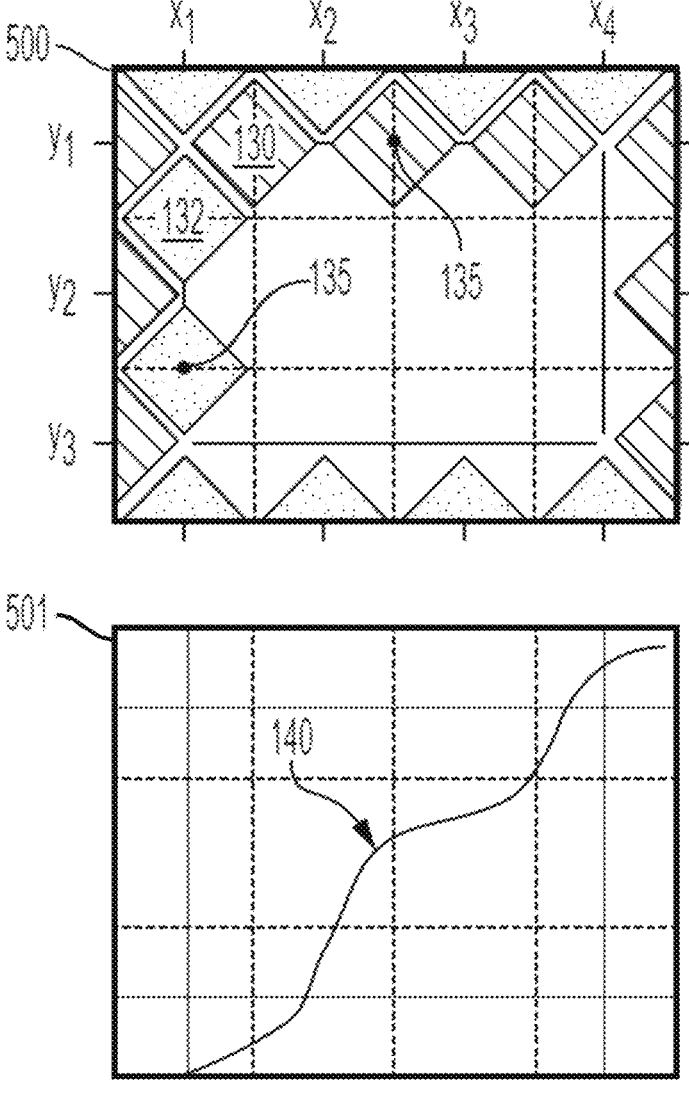
FIGS. 5A and 5B show ITO patterns and corresponding reported pen coordinates of the ITO patterns according to an embodiment of the present application.
Figure 5B:
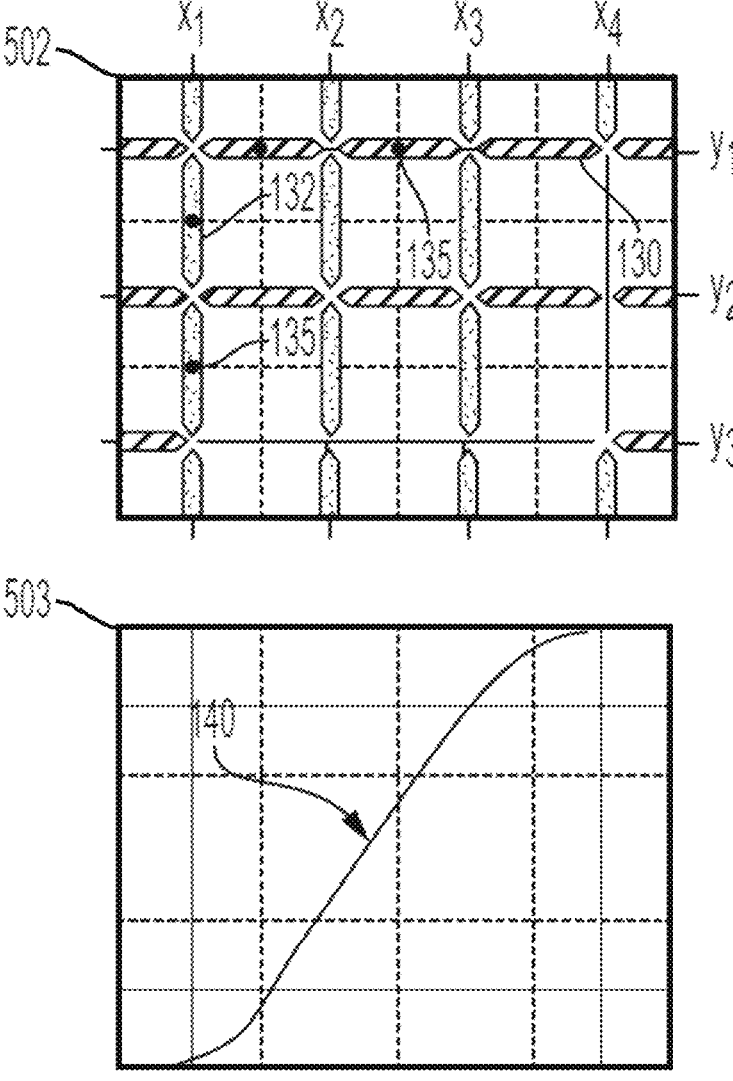

FIGS. 5A and 5B show ITO patterns and corresponding reported pen coordinates of the ITO patterns according to an embodiment of the present application. FIG. 5A shows a diamond pattern 500 for a touchscreen panel and the corresponding reported pen coordinates 501 of the diamond pattern. FIG. 5B shows a matrix pattern 502 for a touch screen panel and a corresponding reported pen coordinates 503 of the matrix pattern. FIGS. 5A-5B will be described in conjunction with FIGS. 1 to 4.

The diamond pattern 500 and the matrix pattern 502 show hash marks x1-x4 along the x-axis and hash marks y1-y3 along the y-axis. The hash marks x1-x4 correspond to a column of capacitive electrodes on the touch panel 200 and the hash marks y1-y3 correspond to a row of capacitive electrodes on the touch panel 200 In one or more embodiments, the hash marks x1-x4 may correspond to RX channels 122 on the touch panel 200 and the hash marks y1-y3 may correspond to TX channels 120 on the touch panel 200. In other embodiments, the hash marks x1-x4 may correspond to TX channels on the touch panel 200 and the hash marks y1-y3 correspond to RX channels on the touch panel 200. The rows of capacitive electrodes y1-y3 and the columns of capacitive electrodes x1-x4 intersect (i.e., x1, y1; x2, y1; x2, y2; etc.) across the touch panel 200.

The reported pen coordinates 501, 503 correspond to the ITO patterns 500, 502. The reported pen coordinates 501, 503 may show various non-linear responses when a straight line is drawn from a bottom left corner to a top right corner across the touchscreen 101 with an active pen 105. The reported pen coordinates 501, 503 may be caused by the different capacitive sensing characteristics of the ITO patterns.

Referring to FIG. 5A, the diamond pattern 500 includes a plurality of touch nodes 130, 132 arranged in a continuous diamond-shaped grid across the touchscreen 101. For example, the TX channels 120 and RX channels 122 intersect between the TX electrodes 130 and RX electrodes 132 as described in FIGS. 3 and 4. The touch nodes 130, 132 are arranged orthogonally in the diamond pattern 500. The reported pen coordinates 501 correspond to the diamond pattern 500 when a straight line is drawn across the touchscreen 101 with the active pen 105.

Referring to FIG. 5B, the matrix pattern 502 includes a plurality of touch nodes 130, 132 arranged vertically and horizontally across the touchscreen 101. The touch nodes 130, 132 are arranged along the TX lines and RX lines in the matrix pattern 502. The reported pen coordinates 503 correspond to the matrix pattern 502 when a straight line is drawn from a bottom left corner to a top right corner across the touchscreen 101 with the active pen 105. The reported pen coordinates 503 show a linear response in the central portion of the touchscreen 101 and has reduced linearity along the edge regions of the touchscreen 101.

In various embodiments, a dynamic kernel selection process can be implemented to adjust the reported pen coordinates to match an actual touch input by an active pen 105 on the touchscreen 101. The dynamic kernel selection process can select and apply a kernel based on an estimate location of the touch input with respect to the location of nearest touch nodes on the touch panel. The regions with reduced linearity, for example, at node intersections or boundaries, may apply different kernel types to compensate for the non-linear capacitive response. The dynamic kernel selection process can provide accurate pen coordinate reporting while accommodating the different ITO patterns. The dynamic kernel selection process will be described in detail below.

Figure 6:
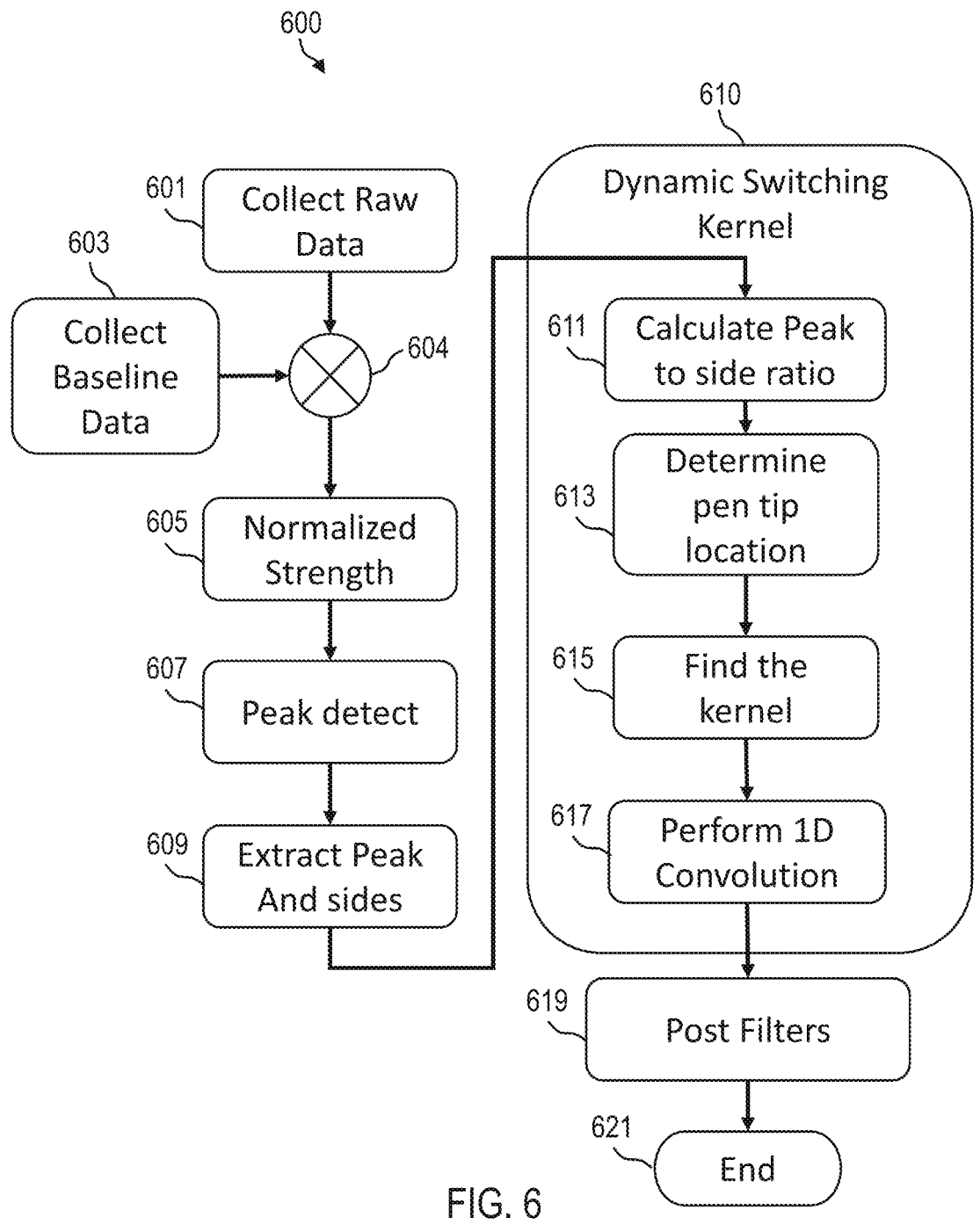
FIG. 6 shows a flowchart of a dynamic kernel selection process according to various embodiments of the present application.

FIG. 6 shows a flowchart of a dynamic kernel selection process according to various embodiments of the disclosure. The flowchart depicts a dynamic kernel selection process 600 for correcting touch coordinates on a touchscreen device. FIG. 6 will be described in conjunction with FIGS. 1 to 5.

The dynamic kernel selection process begins to collect raw data 601 from the touch nodes 130, 132. The raw data 601 or raw strength data represents touch nodes 130, 132 that indicate where touch inputs 140 are located on the touchscreen 101. In one or more embodiments, the raw data 601 can be collected by performing mutual capacitance sensing or during a mutual sensing scan. The mutual sensing scan sequentially activates the TX channels 120 (e.g., TX0, TX1, . . . , TXn–1) to measure capacitance changes at intersections with RX channels 122 (e.g., RX0, RX1, . . . , RXn–1) to enable precise multi-touch detection.

In one or more embodiments, during the mutual sensing scan, the touch controller 109 selects and drives a particular row of touch nodes (e.g., TX channel 120) with a voltage and scans every column of the touch nodes (e.g., RX channels 122). The change in the mutual capacitance at each intersection between a driven TX channel 120 and RX channel 122 is measured to determine the raw data 601. The process is repeated sequentially for each row of the touch nodes (e.g., TX channel 120) to determine the rest of the raw data 601. After determining each strength value of the mutual sensing raw data, each strength value of the mutual sensing raw data may be subtracted from a corresponding baseline strength.

In other words, during the mutual sensing scan when a row of the touch nodes is driven, electric fields form between adjacent touch nodes of the driven TX channel 120 and the respective intersecting columns of the RX channel 122. When capacitive objects such as human fingers or an active pen, touch the touchscreen 101, the electric field lines going through the air between adjacent channels are replaced to pass through the capacitive objects. These interruptions in the electric fields cause a detectable change in the mutual capacitance that can be quantified as raw data.

The dynamic kernel selection process proceeds to collect baseline data 603 from the touch nodes 130, 132. The baseline data 603 represents strength values of the touch nodes 130, 132 when touch input is not present on the touchscreen 101. The baseline data can be a set reference point against which future touch inputs can be measured. In one or more embodiments, the baseline data 603 can be collected by performing self-capacitance sensing during a self-sensing scan. During the self-sensing scan, the touchscreen controller drives the TX channels 120 and scans the RX channels 122. The self-sensing scan involves applying a small voltage to each touch sensor and measuring the resulting capacitance to determine the baseline data 603. In various embodiments, the self-sensing scan captures the baseline strength values and saves the baseline strength values in memory 113.

With the collected raw data 601 and collected baseline data 603, the dynamic kernel selection process proceeds to step 604 to subtract the collected raw data from the collected baseline data to determine normalized strength values 605. The normalized strength values represent changes in capacitance of the touch nodes 130, 132. The normalized strength value is proportional to the change in capacitance of the touch node 130, 132. For example, when a touch input is at or near a touch node, the touch nodes have a change in capacitance that corresponds to the magnitude of the normalized strength values. When the normalized strength value of a touch node has a large magnitude, a touch input can be determined to be at or near the touch node. In one or more embodiments, the normalized strength values can be pen strength values that represent changes in capacitance on the touch nodes 130, 132 from an active pen 105. In some embodiments, the normalized strength values can be finger touch values that represent changes in capacitance on the touch nodes 130, 132 from a user's finger.

With the normalized strength values, the process proceeds to perform peak detection 607. In one or more embodiments, performing peak detection 607 involves identifying a peak touch node. The peak touch node is based on the normalized strength values or pen strength values. The peak touch node is the touch node 130, 132 that has a peak strength value or the largest normalized strength value across the touchscreen 101. For example, a peak touch node has a magnitude that is larger than the magnitude of other touch nodes 130, 132 on the touchscreen 101. The peak touch node can be used to determine an approximate location of a touch input from the active pen 105. In various embodiments, the peak touch node may be referred to as a first touch node with a peak strength value.

When the peak touch node or first touch node has been determined, the process continues to step 609 to extract the normalized strength values of the peak touch node and a plurality of neighboring touch nodes. In one or more embodiments, the neighboring touch nodes are touch nodes that surround the peak touch node or first touch node. The neighboring touch nodes may include two or more touch nodes that surround the peak touch node. The neighboring touch nodes may be along the same column or row of the peak touch node.

In one or more embodiments, the peak touch node and neighboring touch nodes may include three touch nodes with one neighboring touch node on each side of the peak touch node. The neighboring touch nodes may include a first neighboring touch node (i.e., a second touch node) on a first side of the peak touch node (i.e., first touch node) and a second neighboring touch node (i.e., a third touch node) on a second side of the peak touch node opposite from the first side. When the first neighboring touch node (i.e., a second touch node) is next to or adjacent to the peak touch node (i.e., first touch node), the approximate location of the touch input is between the peak touch node and the first neighboring touch node. The second neighboring touch node (i.e., third touch node) is a touch node opposite from the first neighboring touch node (i.e., second touch node) with respect to the peak touch node (i.e., first touch node). The extracted peak and neighboring touch nodes can be used in a dynamic switching kernel process 610 to determine a kernel to apply in the dynamic kernel selection process 600.

In one or more embodiments, the peak touch node and neighboring touch nodes may include more than three touch nodes with one or more neighboring touch nodes on each side of the peak touch node. The neighboring touch nodes may include one or more touch nodes on the first side of the peak touch node (i.e., first touch node) and one or more touch nodes on the second side of the peak touch node opposite from first side. For example, the neighboring touch nodes may include two neighboring touch nodes (i.e., a second touch node and a third touch node) on a first side of the peak touch node (i.e., first touch node) and one neighboring touch node (i.e., a fourth touch node) on a second side of the peak touch node opposite from the first side. As another example, the neighboring touch nodes may include two neighboring touch nodes (i.e., second and third touch node) on the first side of the peak touch node (i.e., first touch node) and two neighboring touch nodes (i.e., fourth and fifth touch node) on the second side of the peak touch node. In one or more embodiment, the neighboring touch node having the second largest normalized strength value (e.g., second touch node) is next to or adjacent to the peak touch node (i.e., first touch node), the approximate location of the touch input is between the peak touch node and the second touch node.

Within the dynamic switching kernel block 610, the touch controller 109 calculates a peak-to-side ratio in step 611 using the extracted strength values of the peak touch node and the neighboring touch nodes from step 609. The peak-to-side ratio can determine a location of an active tip 104 of the active pen 105 that is relative to the location of the peak touch node and the neighboring touch nodes on the touchscreen 101.

In one or more embodiments, the peak-to-side ratio can be calculated using the formula:

$$\text{abs}\left(\frac{\text{first strength value} \times \text{third strength value}}{(\text{second strength value})^2}\right),$$

where the first strength value is a strength value for the peak touch node (i.e., first touch node), the second strength value is a strength value for a first neighboring touch node (i.e., second touch node), and the third strength value is a strength value for a second neighboring touch node (i.e., third touch node). In one or more embodiments, the first strength value is greater than the second strength value, and the second strength value is greater than the third strength value.

In one or more embodiments, the touch controller 109 may calculate a peak-to-side ratio in step 611 using more than three touch nodes when a signal-to-noise ratio between the peak touch node and the first neighboring touch node is 1 or greater. For example, the touch controller 109 may use more than three touch nodes to calculate the peak-to-side ratio when the signal-to-noise ratio between the first strength value and the second strength value is 1 or greater. When the first strength value and the second strength value have a signal-to-noise ratio close to 1, the touch controller 109 may expand to more than two neighboring touch nodes on each side of the peak touch node. For example, the touch controller 109 may calculate the peak-to-side ratio using the peak touch node, two neighboring touch nodes (i.e., a second touch node and a third touch node) on a first side of the peak touch node (i.e., first touch node) and one neighboring touch node (i.e., a fourth touch node) on a second side of the peak touch node opposite from the first side.

In one or more embodiments, when the peak touch node and neighboring touch nodes include more than three touch nodes, the first strength value may be a strength value for the peak touch node (i.e., first touch node), the second strength value may be an average of the next largest set of strength values of the neighboring touch nodes, and the third strength value may be an average of the smallest set of strength values of the neighboring touch nodes. For example, the peak-to-side ratio can be calculated using the formula:

$$\text{abs}\left(\frac{\text{first strength value} \times \text{average of smallest strength values}}{(\text{average of next largest set of strength values})^2}\right).$$

For example, the peak-to-side ratio for four touch nodes can be calculated using formula:

$$abs\left(\frac{\text{strength value of peak touch node} \times (\text{average of strength values for third and fourth touch nodes})}{(\text{strength value of second touch node})^2}\right),$$

where the strength value of the peak touch node is greater than the strength value of the second touch node, the strength value of the second touch node is the next largest strength value and greater than the strength value of the third touch node and the strength value of the fourth touch node, and the smallest set of strength values are the strength value of the third touch node and the strength value of the fourth touch node. For example, the peak-to-side ratio for five touch nodes can be calculated using formula:

$$abs\left(\frac{\text{strength value of peak touch node} \times (\text{average of strength values for third and fifth touch nodes})}{(\text{average of strength values for second and fourth touch node})^2}\right),$$

where the strength value of the peak touch node is the largest strength value, the next largest set of strength values are the second touch node and the fourth touch node, and the smallest set of strength values are the strength values of the third touch node and the fourth touch node.

The process proceeds to step 613 to determine the active tip 104 location based on the calculated peak-to-side ratio. The calculated peak-to-side ratio can be used to determine an approximate location of the active tip 104 relative to the location of the peak touch node and one of the neighboring touch nodes on the touchscreen 101. In one or more embodiments, the approximate locations relative to the location of the peak touch node and one of the neighboring touch nodes include a central region 150, a midpoint region 152, and an intermediate region 154 as described in FIG. 3B. In various embodiments, the central region 150 is a region closest to the peak touch node, the midpoint region 152 is a region at an edge of the peak touch node and closest to one of the neighboring touch nodes, and the intermediate region 154 is a region in between the central region 150 and the midpoint region 152.

In one or more embodiments, the peak-to-side ratios calculated from these strength values can indicate whether the touch input of an active tip is in the central region 150, midpoint region 152, or intermediate region 154. For example, the peak-to-side ratios may be a ratio between 0.8 and 1 for a central region 150, a ratio between 0 and 0.2 for a midpoint region 152, and a ratio between 0.2 and 0.8 for an intermediate region 154. The calculated peak-to-side ratio is a larger value (e.g., ratio>0.8) when the location of the active tip is in a central region 150 closest to the peak touch node. In some embodiments, the calculated peak-to-side ratio may be greater than 1 when the active tip is in the central region 150. The calculated peak-to-side ratio is a smaller value or closer to zero (e.g., 0<ratio<0.2) when the location of the active tip is in a midpoint region 152 between the peak touch node and one of the neighboring touch nodes. The calculated peak-to-side ratio is a value between the maximum range of the midpoint region ratio (e.g., 0.2) and the minimum range of the central region ratio (e.g., 0.8) when the location of the active tip is in the intermediate region 154.

The location of the active tip determined in step 613 can be used to find and select a kernel type in step 615. In one or more embodiments, the kernel type includes a sharpening kernel, a smoothening kernel, and a flattening kernel. The sharpening kernel can be used to sharpen the strength of the peak touch node to reduce the impact caused by the neighboring touch nodes on the reported pen coordinates. The smoothening kernel can be used to spread the strength linearly between the peak touch node and the neighboring touch node. The flattening kernel can be used to flatten the strength between the peak touch node and the neighboring touch node. The selected kernel type can be applied through 1D convolution in step 617 to determine a corrected location of the active pen to be reported to the host. In various embodiments, the 1D convolution step 617 may be 2-pass 1D convolution. In 2-pass 1D convolution, one pass may be performed in the TX channels and one pass may be performed in the RX channels. While the sharpening kernel, smoothening kernel, and flattening kernel are described further in detail, it should also be appreciated that other kernel types can be utilized in the dynamic kernel selection process.

In one or more embodiments, following the dynamic switching kernel process 610, the process 600 can perform a post-filtering step 619 to further enhance position accuracy. The post-filters may include, for example, an IIR post-processing filter, a Kalman filter, a motion-tolerance filter, or a combination of filters. The process concludes at the end block 621 after generating the corrected pen coordinates.

Figures 7A, 7B:
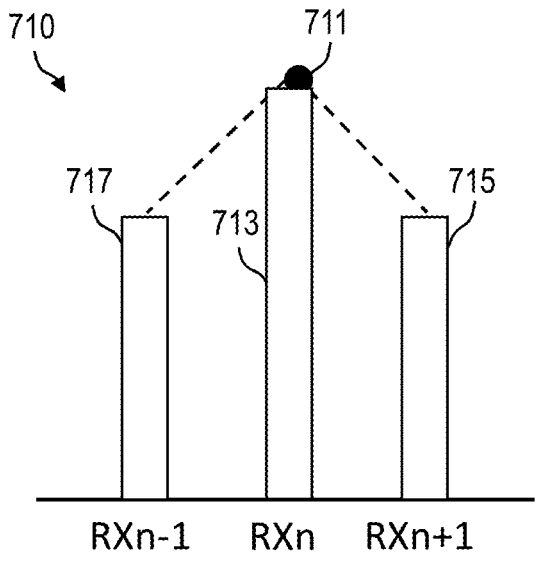
FIGS. 7A to 7D shows a kernel type selection process according to an embodiment of the present application.
Figure 7C:
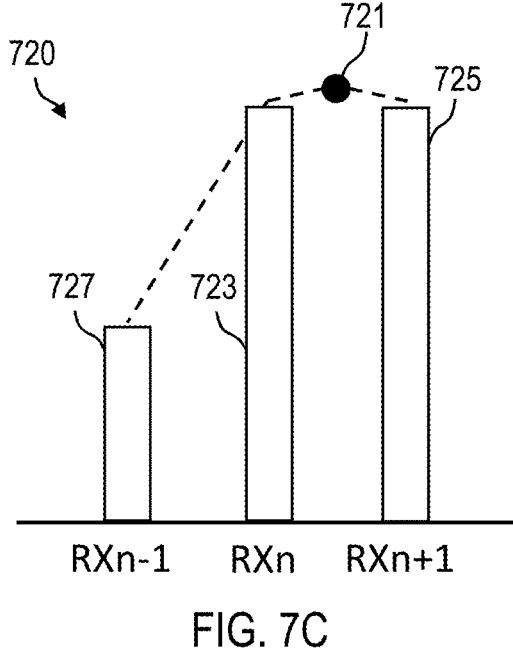
Figure 7D:
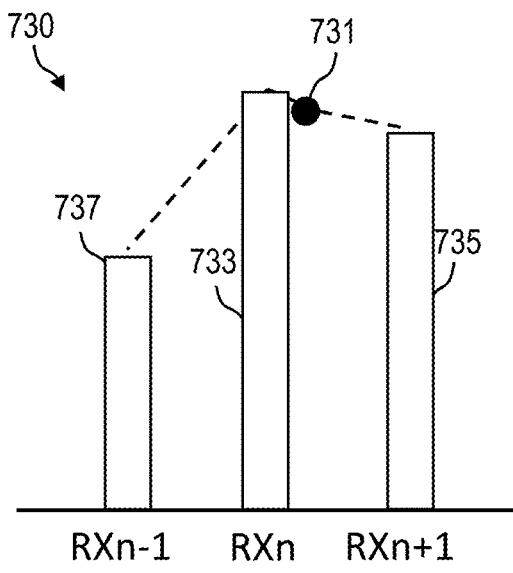

FIGS. 7A to 7D shows a kernel type selection process according to an embodiment of the present application. FIG. 7A shows a spatial filter kernel table 700, FIG. 7B shows a strength distribution across touch nodes for a touch input located in a central region 150, FIG. 7C shows a strength distribution across touch nodes for a touch input located in a midpoint region 152, and FIG. 7D shows a strength distribution across touch nodes for a touch input located at in intermediate region 154. FIGS. 7A-7D will be described in conjunction with FIGS. 1 to 6.

FIG. 7A shows a spatial filter kernel table 700 that can be used to determine a kernel type (e.g., in step 615) to apply to the 1D convolution (e.g., step 617). The spatial filter kernel table 700 can be stored in memory 113 and the touch controller 109 can reference the spatial filter kernel table 700 to determine the kernel type to apply. The kernel type is selected based on the location of touch input relative to the peak touch nodes and neighboring touch nodes. The kernel type can include an a-type kernel (e.g., sharpening kernel) and a b-type kernel (e.g., smoothening kernel). In one or more embodiments, the a-type kernel may be a sharpening kernel and the b-type kernel may be a smoothening kernel. In other embodiments, the a-type kernel may be a smoothening kernel and the b-type kernel may be a sharpening kernel.

For example, when the location of the touch input is in a central region 150, the a-type kernel (e.g., sharpening kernel) may be selected to sharpen the strength of the peak touch node. When the location of the touch input is in a midpoint region 152 or an intermediate region 154, the b-type kernel (e.g., smoothening or flattening kernel) may be selected to smoothen or flatten the strength of the peak touch node and neighboring touch node.

FIGS. 7B-7D show strength distributions 710, 720, 730 across touch nodes for various touch inputs 711, 721, 731. The strength distributions 710, 720, 730 provide a visual representation of the strength values at touch nodes 130, 132 on a touchscreen 101. The arrows on the strength distributions 710, 720, 730 represent a magnitude of strength for the corresponding touch node. The strength distributions 710, 720, 730 show a first touch node RXn, a second touch node RXn+1, and a third touch node RXn−1 opposite from the second touch node. The first touch node RXn may be referred to as the peak touch node or the central touch node. The second touch node RXn+1 may be referred to as the first neighboring touch node and the third touch node RXn−1 may be referred to as the second neighboring touch node opposite from the first neighboring touch node. While the strength distribution 710 is shown along a horizontal axis, the corresponding touch nodes 130, 132 on the touch panel 200 may be touch nodes that are vertically adjacent or diagonally adjacent to the first touch node (i.e., peak touch node).

Referring to FIG. 7B, the touch input 711 is located in a central region 150 of the peak touch node. In one or more embodiments, when the touch input 711 is located in the central region 150 of the peak touch node, the magnitude of strength 713 of the peak touch node RXn will be greater than the magnitude of strength 715 of the first neighboring touch node RXn+1 and the magnitude of strength 717 of the second neighboring touch node RXn−1. The magnitude of the first neighboring touch node and the magnitude of the second neighboring touch node may have similar magnitudes that is less than the magnitude of the peak touch node. When the touch input 711 is located in the center region, the touch controller 109 can select the a-type kernel to perform 1D convolution. For example, the touch controller 109 may select the sharpening kernel as the a-type kernel to sharpen the strength of the peak touch node to refine the pen coordinates.

Referring to FIG. 7C, the touch input 721 is located in a midpoint region 152 between the peak touch node and the first neighboring touch node. In one or more embodiments, when the touch input 721 is located in the midpoint region 152, the magnitude 723 of the peak touch node RXn may be similar to or equal to the magnitude 725 of the first neighboring touch node RXn+1. As a result of the touch input 721 being closer to the first neighboring touch node RXn+1 than the second neighboring touch node RXn−1, the magnitude 727 of the second neighboring touch node RXn−1 will be less than the magnitudes 723, 725 of the peak touch node and the first neighboring touch node. When the touch input 721 is located in the midpoint region 152, the touch controller 109 can select the b-type kernel to perform 1D convolution. For example, the touch controller 109 may select the smoothening kernel as the b-type kernel to spread the strength linearly between the peak touch node and the first neighboring touch node to refine the pen coordinates.

Referring to FIG. 7D, the touch input 731 is located in an intermediate region 154 between the central region 150 and the midpoint region 152. In one or more embodiments, when the touch input 731 is located in the intermediate region 154, the magnitude 733 of the peak touch node RXn will be slightly greater than the magnitude 735 of the first neighboring touch node RXn+1. As a result of the touch input 731 being closer to the peak touch node RXn than the first neighboring touch node RXn+1, the magnitude 737 of the second neighboring touch node RXn−1 will be slightly greater than the magnitude 727 of the second neighboring touch node in FIG. 7C when the touch input is closer to the first neighboring touch node. When the touch input 731 is located in the intermediate region 154, the touch controller 109 can select the b-type kernel to perform 1D convolution. For example, the touch controller 109 may select the smoothening kernel as the b-type kernel to spread the strength linearly between the peak touch node and the first neighboring touch node to refine the pen coordinates.

Figure 8A:
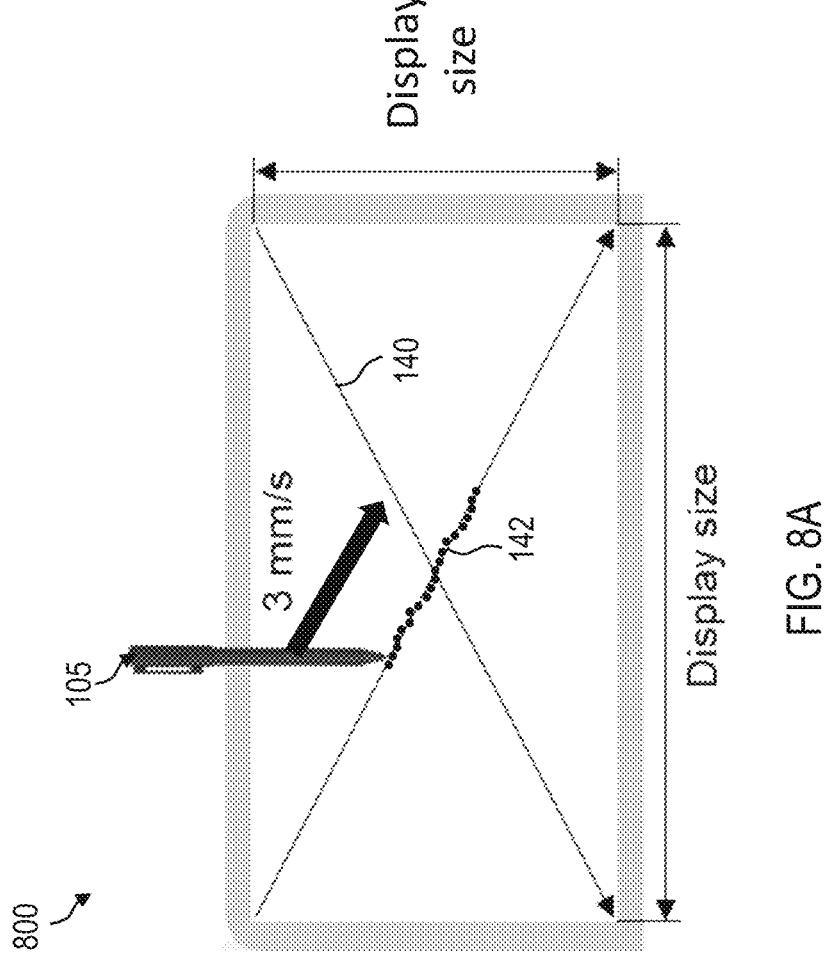
FIGS. 8A to 8C show a linearity test performed on an electronic device according to an embodiment of the present application.
Figure 8B:
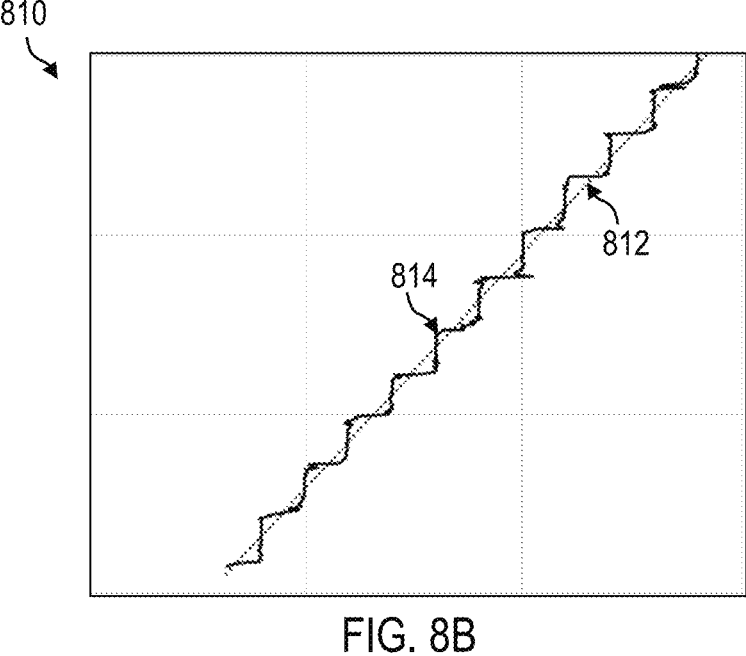
Figure 8C:
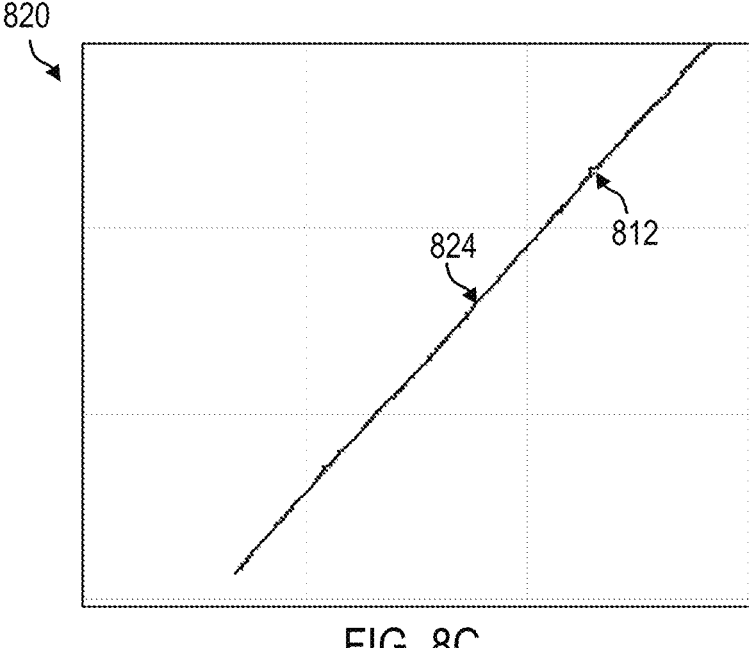

FIGS. 8A to 8C show a linearity test performed on an electronic device according to an embodiment of the present application. FIGS. 8A to 8C will be described in conjunction with FIGS. 1 to 6.

FIG. 8A shows a linearity test 800 on an electronic device according to an embodiment of the present application. The linearity test 800 may be used to determine a linearity error or determine whether the reported pen coordinates 142 accurately reflects the actual lines (i.e., touch inputs 140) drawn across the touchscreen 101 with an active pen 105. The linearity test 800 can be performed by drawing two diagonal lines at a steady rate across the touchscreen 101. For example, the two diagonal lines may be drawn at a rate of 3 mm/s from a top right corner to a bottom left corner and a top left corner to a bottom right corner of the touchscreen 101. In one or more embodiments, the reported pen coordinates 142 can be collected while drawing the lines across the touchscreen 101 and a best-fit line can be calculated. The linearity error can be determined by the distance between the reported pen coordinates and the calculated best fit line. When the dynamic kernel selection process 600 is implemented, the reported pen coordinates 142 are shown to be overlapping or relatively close to the actual lines drawn across the touchscreen 101 in the linearity test 800.

FIG. 8B shows a linearity result 810 from the linearity test 800 on an electronic device without applying the dynamic kernel selection process 600. The linearity result 810 shows line 812 that represents a line drawn across the touchscreen 101 with an active pen 105 and line 814 that represents the reported pen coordinates 142 without applying the dynamic kernel selection process 600. When the dynamic kernel selection process is not implemented, the linearity result 810 shows a linearity error where line 814 of the reported touch coordinates deviates from line 812 drawn across the touchscreen 101.

FIG. 8C shows a linearity result 820 from the linearity test 800 on an electronic device with the dynamic kernel selection process 600. The linearity result 820 shows line 812, also shown in FIG. 8B, that represents the line drawn across the touchscreen 101 with an active pen 105 and line 824 that represents the reported pen coordinates 142 with the dynamic kernel selection process 600 implemented. When the dynamic kernel selection process 600 is implemented, the linearity result 820 shows significant overlap between line 824 of the reported pen coordinates and line 812 drawn across the touchscreen 101.

Figure 9A:
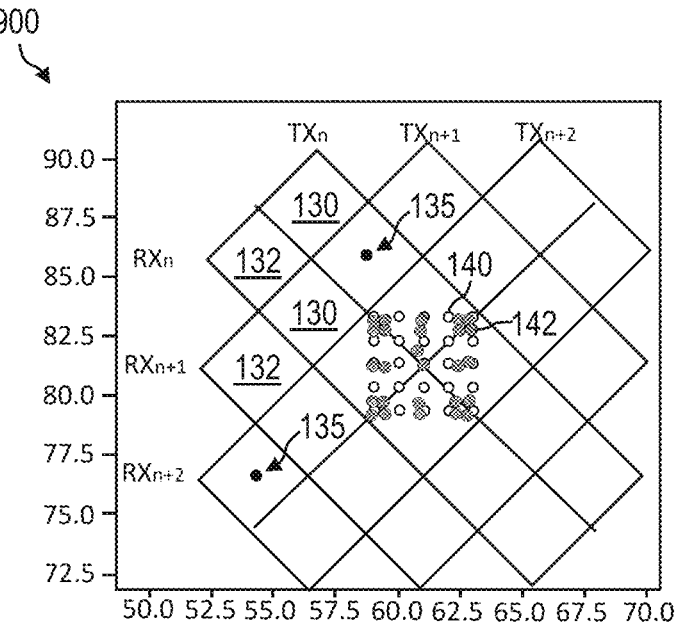
FIGS. 9A and 9B show outputs of reported pen coordinates on an electronic device according to an embodiment of the present application.
Figure 9B:
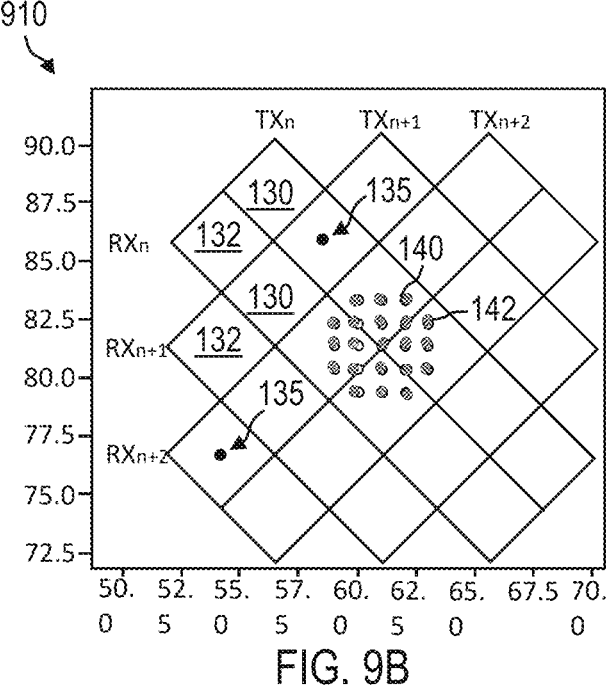

FIGS. 9A and 9B show outputs of reported pen coordinates on an electronic device according to an embodiment of the present application. FIG. 9A shows the output 900 of the reported pen coordinates on an electronic device without implementing the dynamic kernel selection process and FIG. 9B shows the output 910 of the reported pen coordinates on an electronic device implementing the dynamic selection process.

The outputs 900, 910 show touch inputs 140 and the corresponding reported pen coordinates 142 on a diamond pattern touch panel. In one or more embodiments, the touch inputs 140 may be touch inputs made with an active tip 104 on an active pen 105 for a precise touch input. As shown in FIG. 9A, some of the reported pen coordinates 142 overlap with the touch inputs 140 but several of the reported pen coordinates 142 do not overlap with and are not near the corresponding touch input 402 when the dynamic kernel selection process is not implemented. As shown in FIG. 9B, the reported pen coordinates 142 provide a significant overlap with the corresponding touch input when the dynamic kernel selection process is implemented.

Example embodiments of the present invention are summarized here. Other embodiments can also be understood from the entirety of the specification and the claims filed herein.

Example 1. A first example includes a method that includes: receiving a signal from an active pen; collecting a first strength value from a first touch node and a second strength value from a second touch node of a touchscreen, the second touch node being adjacent to the first touch node; calculating a peak-to-side ratio from the first strength value and the second strength value; determining a location of the active pen between the first touch node and the second touch node based on the calculated peak-to-side ratio; selecting a kernel type based on the location of the active pen; applying the selected kernel type to the first strength value and the second strength value; and reporting a corrected location of the active pen on the touchscreen based on the applied kernel type.

Example 2. The method of example 1, where selecting the kernel type based on the location of the active pen includes: selecting a first kernel type when the location of the active pen is in a central region of the first touch node; selecting a second kernel type when the location of the active pen is in a midpoint region of the first touch node that is adjacent to the second touch node; and selecting the second kernel type when the location of the active pen is in an intermediate region between the central region and the midpoint region.

Example 3. The method of one of examples 1 or 2, further includes collecting a third strength value from a third touch node adjacent to the first touch node, the third touch node being opposite from the second touch node, where the first strength value is greater than the second strength value and where the third strength value is less than or equal to the second strength value.

Example 4. The method of any one of examples 1 to 3, where the peak-to-side ratio is $$\text{calculated using } abs\left(\frac{\text{first strength value} \times \text{third strength value}}{(\text{second strength value})^2}\right).$$

Example 5. The method of any one of examples 1 to 4, where selecting the kernel type includes: selecting a sharpening kernel when the calculated peak-to-side ratio is greater than 1; and selecting a smoothening kernel when the calculated peak-to-side ratio is less than 1.

Example 6. The method of any one of examples 1 to 5, further includes applying a post-filter to a result of the applied selected kernel type, where reporting the corrected location of the active pen on the touchscreen includes reporting the corrected location of the active pen based on the applied post-filter.

Example 7. The method of any one of examples 1 to 6, where applying the post-filter includes applying an IIR post-processing filter, a Kalman filter, or a motion-tolerance filter.

Example 8. A second example includes a device that includes: a touchscreen, a touch controller, and a non-transitory memory storing a program to be executed by the touch controller. The touchscreen includes a plurality of touch nodes including a first touch node that is adjacent to a second touch node. The program comprising instructions to: receive a signal from an active pen; collect a plurality of strength values from the plurality of touch nodes calculate a peak-to-side ratio from a first strength value if the first touch node and a second strength value of the second touch node; determine a location of the active pen between the first touch node and the second touch node based on the calculated peak-to-side ratio; select a kernel type based on the location of the active pen; apply the selected kernel type to the plurality of strength values; and reporting a corrected location of the active pen on the touchscreen based on the applied kernel type.

Example 9. The device of example 8, where the kernel type includes: a first kernel type to be selected when the location of the active pen is in a central region of the first touch node; and a second kernel type to be selected when the location of the active pen is in a midpoint region of the first touch node that is adjacent to the second touch node or an intermediate region between the central region and the midpoint region.

Example 10. The device of examples 8 or 9, where the touch controller is further configured to perform 1D convolution using the selected kernel type and the plurality of strength values, and where the corrected location of the active pen is based on a result of the 1D convolution.

Example 11. The device of any one of examples 8 to 10, where the touch controller is further configured to collect a third strength value from a third touch node adjacent to the first touch node and opposite from the second touch node, where the third strength value is less than or equal to the second strength value.

Example 12. The device of any one of examples 8 to 11, where the peak-to-side ratio is $$\text{calculated using } abs\left(\frac{\text{first strength value} \times \text{third strength value}}{(\text{second strength value})^2}\right).$$

Example 13. The device of any one of examples 8 to 12, where the first kernel type includes a sharpening kernel and the second kernel type includes a smoothening kernel. The touch controller is further configured to: select the sharpening kernel when the calculated peak-to-side ratio is greater than 1; and select the smoothening kernel when the calculated peak-to-side ratio is less than 1.

Example 14. The device of any one of examples 8 to 13, where the touch controller is further configured to apply a post-filter to a result of the applied kernel type, where the corrected location of the active pen on the touchscreen is based on the post-filter applied to the result of the applied kernel type.

Example 15. The device of any one of examples 8 to 14, where the post-filter includes an IIR post-processing filter, a Kalman filter, or a motion-tolerance filter.

Example 16. A third example includes a method that includes: receiving a signal from an active pen; performing a self-sensing scan to collect strength data on a touchscreen; determining a location of the active pen between a first touch node and a second touch node based on the collected strength data, the first touch node being next to the second touch node; selecting a kernel type based on the location of the active pen; performing 1D convolution based the selected kernel type and the collected strength data; and reporting a corrected location of the active pen on the touchscreen based on a result of the 1D convolution.

Example 17. The method of example 16, where determining the location of the active pen includes: extracting a peak strength value from the first touch node, a first neighboring strength value from the second touch node, and a second neighboring strength value from a third touch node adjacent to the first touch node and opposite from the second touch node; calculating a peak-to-side ratio of the extracted strength values from the peak strength value, first neighboring strength value, and the second neighboring strength value; and determining the location of the active pen based on the calculated peak-to-side ratio.

Example 18. The method of examples 16 or 17, where the calculated peak-to-side ratio is calculated using $$abs\left(\frac{\text{peak strength value} \times \text{second neighboring strength value}}{(\text{first neighboring strength value})^2}\right),$$

where the second neighboring strength value is less than or equal to the first neighboring strength value.

Example 19. The method of any one of examples 16 to 18, where the location of the active pen includes a central region of the first touch node, a midpoint region of the first touch node that is adjacent to the second touch node, and an intermediate region between the central region and the midpoint region, and where selecting the kernel type includes: selecting a sharpening kernel when the location of the active pen is in the central region; and selecting a smoothening kernel when the location of the active pen is in the midpoint region or intermediate region.

Example 20. The method of any one of examples 16 to 19, the method further includes applying a post-filter based on the location of the active pen.

Example 21. A fourth example includes a method that includes: performing a self-sensing scan to collect strength data on a touchscreen; determining a location of an active pen on a first touch node based on the collected strength data, the location of the active pen includes a central region on the first touch node, a midpoint region on the first touch node, and an intermediate region on the first touch node; selecting a kernel type based on the location of the active pen; performing 1D convolution based the selected kernel type and the collected strength data; and reporting a corrected location of the active pen on the touchscreen based on a result of the 1D convolution.

Example 22. The method of example 21, where determining the location of the active pen includes: extracting a first strength value from the first touch node, a second strength value from an average strength value of a first set of neighboring touch nodes, and a second neighboring strength value from an average strength value of a second set of neighboring touch nodes, where each strength value of the first set of neighboring touch nodes is greater than each strength value of the second set of neighboring touch nodes; calculating a peak-to-side ratio of the extracted strength values from the first strength value, the second strength value, and the third strength value; and determining the location of the active pen based on the calculated peak-to-side ratio.

Example 23. The method of examples 21 or 22, where the calculated peak-to-side ratio is equal to $$abs\left(\frac{\text{first strength value} \times \text{third strength value}}{(\text{second strength value})^2}\right),$$

where the first strength value is greater than the second strength value and the second strength value is greater than or equal to the third strength value.

Example 24. The method of any one of examples 21 to 23, where determining a location of the active pen includes determining whether the location of the active pen is in the central region, the midpoint region, or the intermediate region, and where selecting the kernel type includes: selecting a sharpening kernel when the location of the active pen is in the central region; and selecting a smoothening kernel when the location of the active pen is in the midpoint region or the intermediate region.

Example 25. The method of any one of examples 21 to 24, where the first set of neighboring touch nodes includes one or more touch nodes and the second set of neighboring touch nodes includes one or more touch nodes.

Example 26. The method of any one of examples 21 to 25, where the first set of neighboring touch nodes includes a different number of touch nodes than the second set of neighboring touch nodes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving a signal from an active pen;
   collecting a first strength value from a first touch node and a second strength value from a second touch node of a touchscreen, the second touch node being adjacent to the first touch node;
   calculating a peak-to-side ratio from the first strength value and the second strength value;
   determining a location of the active pen between the first touch node and the second touch node based on the calculated peak-to-side ratio;
   selecting a kernel type based on the location of the active pen;
   applying the selected kernel type to the first strength value and the second strength value; and
   reporting a corrected location of the active pen on the touchscreen based on the applied kernel type.

2. The method of claim 1, wherein selecting the kernel type based on the location of the active pen comprises:
   selecting a first kernel type when the location of the active pen is in a central region of the first touch node;
   selecting a second kernel type when the location of the active pen is in a midpoint region of the first touch node that is adjacent to the second touch node; and
   selecting the second kernel type when the location of the active pen is in an intermediate region between the central region and the midpoint region.

3. The method of claim 1, further comprising collecting a third strength value from a third touch node adjacent to the first touch node, the third touch node being opposite from the second touch node, wherein the first strength value is greater than the second strength value and wherein the third strength value is less than or equal to the second strength value.

4. The method of claim 3, wherein the peak-to-side ratio is calculated using $$abs\left(\frac{\text{first strength value} \times \text{third strength value}}{(\text{second strength value})^2}\right).$$

5. The method of claim 4, wherein selecting the kernel type comprises:

selecting a sharpening kernel when the calculated peak-to-side ratio is greater than 1; and selecting a smoothening kernel when the calculated peak-to-side ratio is less than 1.

6. The method of claim 1, further comprising applying a post-filter to a result of the applied selected kernel type, wherein reporting the corrected location of the active pen on the touchscreen comprises reporting the corrected location of the active pen based on the applied post-filter.

7. The method of claim 6, wherein applying the post-filter comprises applying an IIR post-processing filter, a Kalman filter, or a motion-tolerance filter.

8. A device comprising:

a touchscreen comprising a plurality of touch nodes including a first touch node that is adjacent to a second touch node;

a touch controller; and a non-transitory memory storing a program to be executed by the touch controller, the program comprising instructions to:

receive a signal from an active pen;

collect a plurality of strength values from the plurality of touch nodes;

calculate a peak-to-side ratio from a first strength value of the first touch node and a second strength value of the second touch node;

determine a location of the active pen between the first touch node and the second touch node based on the calculated peak-to-side ratio;

select a kernel type based on the location of the active pen;

apply the selected kernel type to the plurality of strength values; and reporting a corrected location of the active pen on the touchscreen based on the applied kernel type.

9. The device of claim 8, wherein the kernel type comprises:

a first kernel type to be selected when the location of the active pen is in a central region of the first touch node; and a second kernel type to be selected when the location of the active pen is in a midpoint region of the first touch node that is adjacent to the second touch node or an intermediate region between the central region and the midpoint region.

10. The device of claim 9, wherein the touch controller is further configured to perform 1D convolution using the selected kernel type and the plurality of strength values, and wherein the corrected location of the active pen is based on a result of the 1D convolution.

11. The device of claim 9, wherein the touch controller is further configured to collect a third strength value from a third touch node adjacent to the first touch node and opposite from the second touch node, wherein the third strength value is less than or equal to the second strength value.

12. The device of claim 11, wherein the peak-to-side ratio is calculated using $$abs\left(\frac{\text{first strength value} \times \text{third strength value}}{(\text{second strength value})^2}\right).$$

13. The device of claim 12, wherein the first kernel type comprises a sharpening kernel and the second kernel type comprises a smoothening kernel, the touch controller is further configured to:

select the sharpening kernel when the calculated peak-to-side ratio is greater than 1; and select the smoothening kernel when the calculated peak-to-side ratio is less than 1.

14. The device of claim 9, wherein the touch controller is further configured to apply a post-filter to a result of the applied kernel type, wherein the corrected location of the active pen on the touchscreen is based on the post-filter applied to the result of the applied kernel type.

15. The device of claim 14, wherein the post-filter comprises an IIR post-processing filter, a Kalman filter, or a motion-tolerance filter.

16. A method comprising:

receiving a signal from an active pen;

performing a self-sensing scan to collect strength data on a touchscreen;

determining a location of the active pen between a first touch node and a second touch node based on the collected strength data, the first touch node being next to the second touch node;

selecting a kernel type based on the location of the active pen;

performing 1D convolution based the selected kernel type and the collected strength data; and reporting a corrected location of the active pen on the touchscreen based on a result of the 1D convolution.

17. The method of claim 16, wherein determining the location of the active pen comprises:

extracting a peak strength value from the first touch node, a first neighboring strength value from the second touch node, and a second neighboring strength value from a third touch node adjacent to the first touch node and opposite from the second touch node;

calculating a peak-to-side ratio of the extracted strength values from the peak strength value, first neighboring strength value, and the second neighboring strength value; and determining the location of the active pen based on the calculated peak-to-side ratio.

18. The method of claim 17, wherein the calculated peak-to-side ratio is calculated using $$abs\left(\frac{\text{peak strength value} \times \text{second neighboring strength value}}{(\text{first neighboring strength value})^2}\right),$$

strength value is less than or equal to the first neighboring strength value.

19. The method of claim 16, wherein the location of the active pen comprises a central region of the first touch node, a midpoint region of the first touch node that is adjacent to the second touch node, and an intermediate region between the central region and the midpoint region, and wherein selecting the kernel type comprises:

selecting a sharpening kernel when the location of the active pen is in the central region; and selecting a smoothening kernel when the location of the active pen is in the midpoint region or intermediate region.

20. The method of claim 16, further comprising applying a post-filter based on the location of the active pen.

* * * * *